United States Patent [19]
Wittern et al.

[11] 3,738,325
[45] June 12, 1973

[54] HUSBANDRY ACCLIMATIZING UNIT

[75] Inventors: Francis A. Wittern, Des Moines; Warren D. Woodley, Adel, both of Iowa

[73] Assignee: Fawn Engineering Corp., Des Moines, Iowa ; by said Woodley

[22] Filed: Feb. 17, 1972

[21] Appl. No.: 227,690

[52] U.S. Cl. .................................. 119/18, 119/52 B
[51] Int. Cl. ............................................ A01k 01/02
[58] Field of Search ................. 119/18, 22, 17, 52 B

[56] References Cited
UNITED STATES PATENTS

| 3,664,302 | 5/1072 | Wienert | 119/18 |
| 3,312,194 | 4/1967 | Ernst | 119/22 |
| 3,292,582 | 12/1966 | Rubricius | 119/17 |
| 2,536,621 | 1/1951 | Arnold | 119/52 B X |
| 2,661,800 | 12/1953 | Reichenbach | 119/18 |

Primary Examiner—Hugh R. Chamblee
Attorney—H. Robert Henderson, Louis J. Strom, Glenn H. Antrim et al.

[57] ABSTRACT

A cage for holding young farm animals after they have left the nursery and before they are let out into the field, the cage opens at the top and perforated at the bottom for collection of the excreta, with a front wall comprised partially of a feed receptacle open to the interior of the cage, and a movable carriage and feed mechanism mounted on top of the cage for reciprocal movement to disperse feed into the receptacle.

1 Claim, 5 Drawing Figures

PATENTED JUN 12 1973 3,738,325
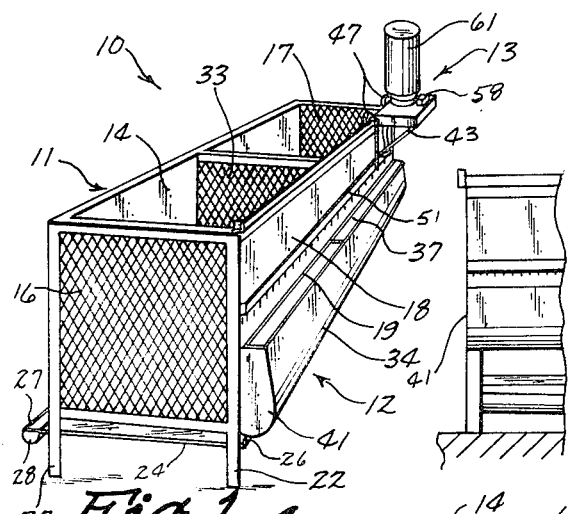
Fig. 1
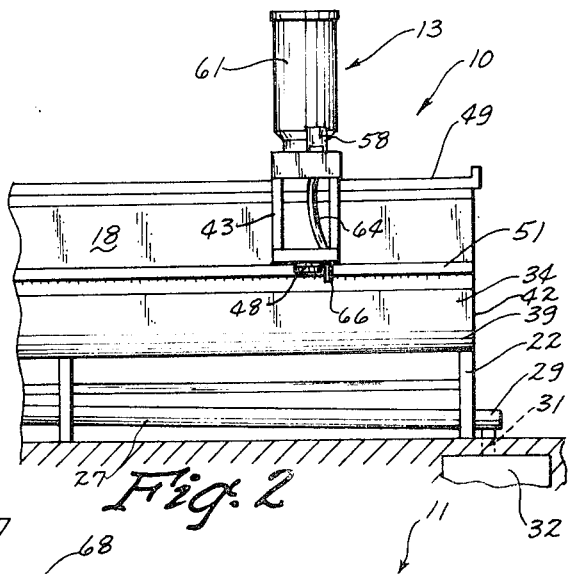
Fig. 2
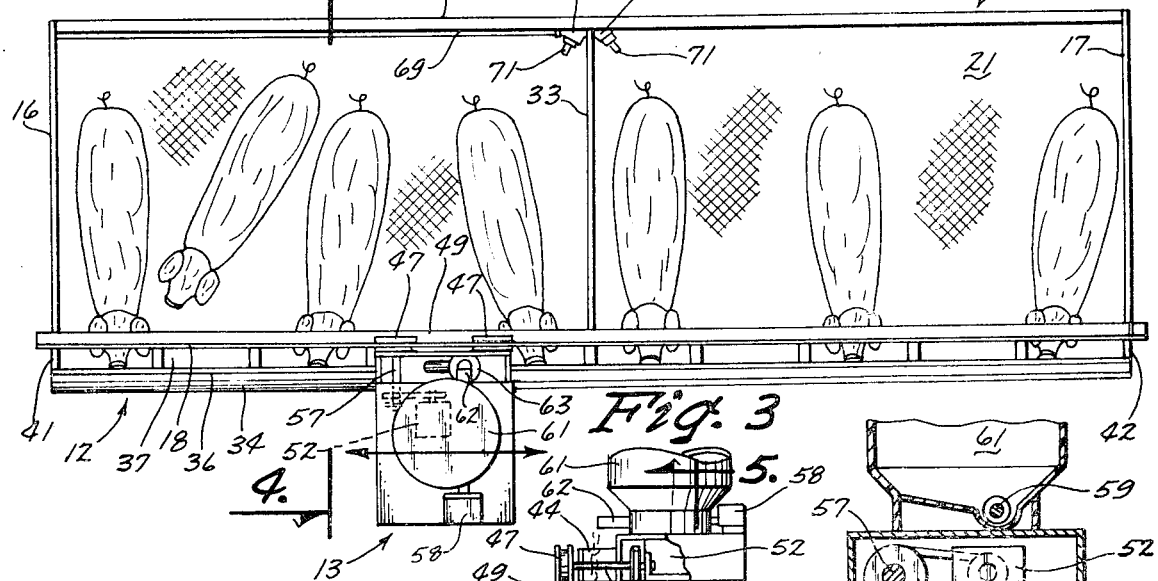
Fig. 3
Fig. 5
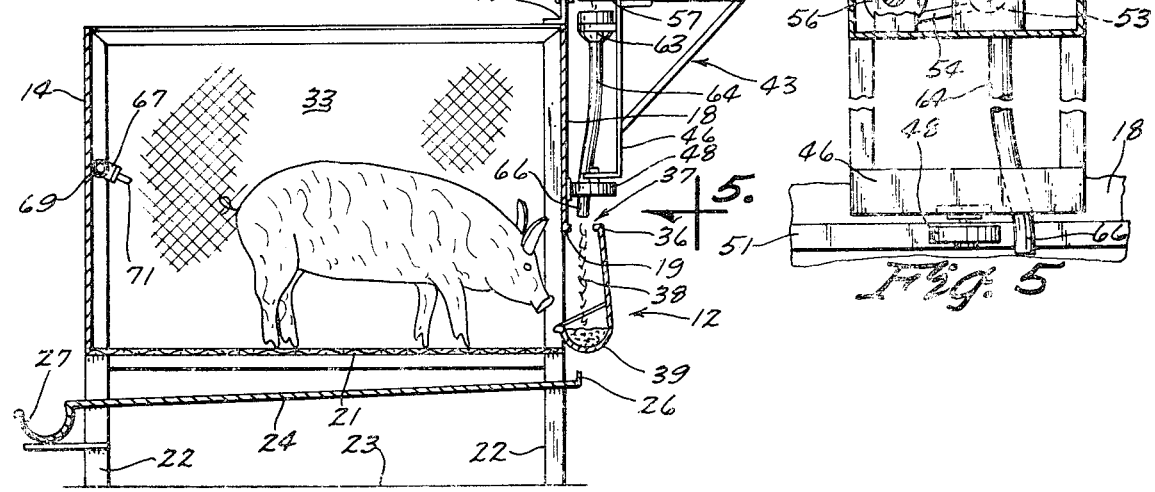
Fig. 4

3,738,325

HUSBANDRY ACCLIMATIZING UNIT

BACKGROUND OF THE INVENTION

There are a plurality of patented and commercially available nursing apparatus for the feeding and caring of farm animals within a few hours after they have been born, keeping them for approximately twenty one days. During that period of time, the babies are usually individually separated in small confined areas within a cage assembly or the like which itself is confined in a heated enclosure for maintaining the babies at a certain warm temperature. They are fed a carefully rationed and balanced diet of warm milk, water and some dry feed during their confinement, and on the whole are pampered comparable to human babies.

Normally, however, and unlike their human counterparts, after their approximate three week confinement, the baby animals are then put out to pasture — so to speak, and are left to fend for themselves. In many instances, it was found that the outstanding gains of the animals due to the nursery apparatus were lost prior to their becoming accustomed to the field. In a continued search for improved farm animal farrowing, applicants determined that there must be a more intelligent handling of these nursery babies to ready them for their life in the field.

SUMMARY OF THE INVENTION

The invention comprises an apparatus for acclimatizing young farm animals just out of the nursery, wherein the animals are caged together in small groups, with the cage placed in an unheated area away from the nursery feeder so as to accustom them to outside temperatures, with means provided for feeding the animals water and dry feed, and further with means for removing the excreta of the animals.

It is an object of this invention to provide a novel and useful farm animal acclimatizing apparatus for housing animals directly after they leave a nursery feeder.

It is another object of this invention to provide an animal acclimatizing apparatus which enables the young animals to become accustomed to other like animals, to become accustomed to normal weather conditions, and to become accustomed to a more solid food.

Still another object of this invention is to provide a unique apparatus which although confining young farm animals enables them to live in an environment somewhat like the field thereby acclimating the animals for same.

It is another object of this invention to provide an apparatus capable of attaining the above designated objectives which is economical, rugged, and effective.

These objects, and other features and advantages of this invention will become readily apparent upon reference to the following description and the accompanying drawings.

BRIEF DESCRIPTION OF THE DRAWINGS

FIG. 1 is a perspective view of the farm animal acclimatizing unit of this invention;

FIG. 2 is a foreshortened, front elevational view of said unit;

FIG. 3 is a plan view of the unit, showing young swine therein;

FIG. 4 is a vertical sectional view taken along the line 4—4 in FIG. 3, and

FIG. 5 is an enlarged vertical sectional view taken along the line 5—5 in FIG. 4.

DESCRIPTION OF THE PREFERRED EMBODIMENT

Referring now to the drawings, a preferred embodiment of the acclimatizing unit of this invention is indicated generally at 10 in FIG. 1, and comprises a cage assembly 11, a feed receptacle 12 secured to the front of the cage assembly 11, and a feed carriage 13 mounted on the top front of the cage assembly 11 and adapted to move back and forth thereon.

The cage assembly 11 includes an upright rear wall 14 (FIGS. 3 and 4), a pair of end walls 16 and 17 of a wire mesh, and an upright front wall 18 (FIGS. 2 and 4) which has a lower edge 19 spaced above a wire mesh floor 21, all of which is secured together with an appropriate framework of angle iron or the like, including upright corner legs 22 for supporting the floor 21 above the surface 23 of the ground or other floor.

The cage assembly 11 includes further a flat pan 24 (FIG. 4) which extends the entire length of the assembly 11 for receiving animal excreta, and which also extends the entire width of the assembly 11. From a front upturned lip 26 (FIG. 4) of the pan 24, the pan 24 slopes rearwardly of the cage assembly 11 to a trough 27 integral therewith, with trough 27 also sloping downwardly from one end 28 (FIG. 2) to the other end 29, where a downspout 31 empties into a sump 32.

Although not imperative to the operation of the acclimatizing unit 10, an upright partition 33 (FIG. 1) placed midway between the end walls 16 and 17 may be provided for dividing the cage area into two pens. Further, more than one partition may be used, although grouping of the animals, in this instance swine, into groups of 4 – 6 has been found to be satisfactory.

The feed receptacle 12 includes an elongated number 34 (FIGS. 3 and 4) which is shaped like a J in cross section, with an upper edge 36 (FIG. 4) spaced horizontally outwardly from the front wall lower edge 19 to form thereby a slot 37 through which feed, indicated generally at 38 in FIG. 4, can be dispensed by the feed carriage 13. The lower portion 39 of the member 34 is formed like a trough to hold the feed 38, and faces inwardly into the cage assembly 11 such that the animals can eat therefrom. The feed receptacle member 34 extends the entire length of the cage 11 and is secured to end posts 22 by a pair of end plates 41 and 42 (FIGS. 1 and 3) which also act to box in the trough portion 39.

The feed carriage 13 includes a triangular frame 43 (FIG. 4) with a pair of brackets 44 and 46 for supporting an upper pair of drive wheels 47 and a lower radial support wheel 48, respectively, as best illustrated in FIG. 4, whereby the frame 43 is rollably supported on the front of the cage assembly 11 for reciprocal movement back and forth thereon. The drive wheels 47 are rotatably mounted onto a track 49 secured to the top front edge of the cage 11, which track extends the entire length of the cage 11, and the support wheel 48 rolls against an elongated strip 51 secured to the face of the front wall 18, and also extended the length of the cage 11. The carriage 13 is thereby rollably suspended on the track 49. Drive for one of the drive wheels 47 is provided by reversible electric motor 52, (FIG. 5) via an output pulley 53, a belt 54, a driven pulley 56, and a drive shaft 57 (FIG. 4).

Another motor 58 (FIG. 4) rotates a distributing auger 59 (FIG. 5) at the bottom of a conventional feed canister 61, for discharging the dry feed 38 stored therein outwardly through a spout 62, from whence it falls into a funnel 63 and is then directed down through a tube 64, the bottom end 66 of which is directed toward the feed receptacle slot 37.

By conventional electric controls (not shown), the feed carriage drive motor 52 is operated to move the carriage back and forth on the cage assembly 11, limit switches being used to reverse and stop the carriage if necessary. Also, the canister feed motor 58 can be operated in timed relationship with the drive motor 52 to obtain the desired feeding quantities. Dry feed supplied by the canister 61 is supplemented by water supplied through a pair of conventional sucking nozzles 67 and 68 (FIG. 3) mounted in the cage 11 on the rear wall 14, a water supply conduit 69 leading thereto from an outside source. These nozzles are normally closed, but open to supply water upon manipulation of a plunger 71 by the animals.

It is seen from this description that an apparatus is provided for receiving very young animals, approximately three weeks old, for example, form a nursery breeding apparatus, such that the animals may become accustomed to the stresses of living together in an environment somewhat like that of the field, thereby readying them for field living and preventing a quick loss of their gain from the nursery apparatus.

We claim:

1. An animal acclimatizing feeder comprising:
   a cage for holding a plurality of animals, said cage having a top, bottom, side walls, end wall, and a front wall;
   said front wall including an upper portion and a lower portion, said upper portion being flat and depending straight downwardly from a junction with said top and having a lower edge spaced vertically above said bottom;
   said lower portion having a J shape in cross section with the upper edge spaced outwardly from said lower edge to form thereby an elongated slot through which feed can pass, and the remainder of said lower portion depending from said upper edge and curving inwardly in a trough-like manner toward the interior of said cage for holding feed, said lower portion inner edge disposed closely adjacent the front edge of said bottom such that said lower portion is disposed outside of said cage.

* * * * *